INVENTORS
BENJAMIN KAZAN
JOHN S. WINSLOW

BY Ronald Zibelli
ATTORNEY

NOTE: DASHED ARROWS INDICATE CURRENT FLOW

INVENTORS
BENJAMIN KAZAN
JOHN S. WINSLOW
BY
Ronald Zibelli
ATTORNEY

Nov. 24, 1970 B. KAZAN ET AL 3,543,031

DEVICE AND PROCESS FOR IMAGE STORAGE

Filed Sept. 29, 1966 4 Sheets-Sheet 3

INVENTORS
BENJAMIN KAZAN
JOHN S. WINSLOW

BY Ronald Zibelli
ATTORNEY

DEVICE AND PROCESS FOR IMAGE STORAGE

Filed Sept. 29, 1966 4 Sheets-Sheet 4

INVENTORS
BENJAMIN KAZAN
JOHN S. WINSLOW

BY Ronald Zibelli
ATTORNEY

United States Patent Office 3,543,031
Patented Nov. 24, 1970

3,543,031

DEVICE AND PROCESS FOR IMAGE STORAGE

Benjamin Kazan, Pasadena, and John S. Winslow, Altadena, Calif., assignors to Xerox Corporation, Rochester, N.Y., a corporation of New York Continuation-in-part of application Ser. No. 514,860, Dec. 20, 1965. This application Sept. 29, 1966, Ser. No. 582,856
Int. Cl. H01l 17/00
U.S. Cl. 250—213 48 Claims

ABSTRACT OF THE DISCLOSURE

This application relates to a solid state storage device having a plurality of spaced electrodes, electroluminescent material including at least one portion forming part of an electrical connection between said spaced electrodes, and a layer of field-effect semiconductor material overlying said electroluminescent material and forming a successive part of said electrical connection, said panel having a charge-retaining surface; and means for forming an electrostatic charge pattern on said charge-retaining surface, said charge pattern controlling by field-effect the current flow between said spaced electrodes.

This application is a continuation-in-part of application Ser. No. 514,860, filed Dec. 20, 1965, now abandoned, both applications being assigned to the same assignee.

This invention relates to electroluminescent devices and, in particular, to electroluminescent devices of the type adapted to store electrical signals. Additionally, the present invention relates to a method for the use of such a storage device which involves producing an electrostatic charge pattern on the surface of a field effect semiconductor material and regulating the flow of current through the storage device by maintaining, modifying and/or removing the charge pattern.

At present, a variety of solid state imaging devices are known but have not received significant utilization because of the practical problems encountered in their operation. The storage action of these devices depends on one of several different phenomenon including the slow decay of conductivity after excitation of a photoconductive material, the hysteresis effect in photoconductors, and optical feed-back. Some of the factors operating against the practical use of such solid state imaging devices include low sensitivity to input radiation, low light output, poor or no half-tones, and difficulty in providing adequate image erasure.

For example, one type of solid state imaging device involves a display panel consisting of a layer of variable impedance material in series with a layer of electroluminescent material, such as described in the patents to Benjamin Kazan, U.S. Nos. 2,768,310, issued Oct. 23, 1956, and 2,949,537, issued Aug. 16, 1960. As described therein, the image is produced by the increase in conductivity of the portions of the variable impedance material, in this instance a photoconductive material, against which incident radiation impinges. Such conductivity increase produces a corresponding luminescence in the adjoining portion of the electroluminescent material. In such imaging devices, the conductance of the variable impedance material may have a reasonably long decay time after the incident radiation is removed so that the image is stored for a considerable period of time. However, such imaging devices have problems of maintaining sufficient brightness during the photoconductive decay period. More important, they have a problem of image removal which generally takes substantial periods of time.

A further type of solid state imaging device is the hysteresis-type photoconductor panel wherein an electric field is simultaneously applied to the photoconductive material. In this arrangement, the photoconductive material becomes conducting when exposed to a small amount of light, the conductivity remaining at an almost constant level for substantial periods of time instead of gradually decaying after excitation. The half-tone response and image brightness of such panels are relatively poor and the operation is critically dependent upon the supply voltage.

As would be expected, it is desirable to have a solid state storage device which is not subject to the aforementioned defects.

Accordingly, it is an object of this invention to provide a new and improved electroluminescent storage device.

A further object of this invention is to provide an imaging device having good output brightness, long storage, and good half-tone response along with simplicity of image production and rapid erasure.

A further object of the present invention is to provide an imaging device based upon a novel principle of operation which permits relative simplicity of construction and operation.

The above and still further objects, features and advantages of the present invention will become apparent upon consideration of the following detailed disclosure of specific exemplary embodiments of the invention.

The above and still further objects may be accomplished in accordance with the present invention by providing a device for the storage of images including an electroluminescent panel comprising a plurality of spaced electrodes on one surface of a supporting substrate, a layer of electroluminescent material overlying the plurality of electrodes and forming part of the electrical connection between the electrodes, and a layer of a field effect semiconductor material overlying the layer of electroluminescent material and forming a succeeding part of the electrical connection between the electrodes, said electroluminescent panel having a surface capable of retaining an electrostatic charge pattern thereon, said panel being in combination with means for depositing a charge pattern on the charge retaining surface. At least one portion of the electroluminescent material forms part of the electrical connection between the electrodes with the successive part of the electrical connection being formed by a portion of the storing field effect semiconductor material. It should be noted that the field effect semiconductor material is capable of conducting current through the body thereof without substantially altering the charge pattern on the charge retaining surface. As will hereinafter be described, by modification of the electrostatic charge pattern on the charge retaining surface, a corresponding image can be produced and stored on the electroluminescent device.

As used in this application, the term "field effect semiconductor" refers to a material which has the conductance thereof modified by applying an electric field perpendicular to the current flow thereby creating a region which effectively reduces the conducting cross-section of the semiconducting material. In the preferred embodiment, the field effect semiconductor material should be capable of retaining for substantial periods of time an electrostatic charge pattern on its surface and conducting current through the body thereof without substantially altering the surface charge pattern. When a single material has both of these physical properties it will be referred to as a "storing field effect semiconductor." That is, the "storing field effect semiconductor" is capable of retaining an electrostatic charge pattern on its surface which then acts as the perpendicular electric field for modifying the conductance of the semiconductor material. Suitable materials exhibiting this combination of characteristics include zinc oxide, lead oxide, and cadmium oxide.

Additionally, many semiconductors which exhibit the field effect phenomenon can be adapted to the practice of this invention even though they are, initially, incapable of retaining an electrostatic charge pattern on their surface for the desired period of time. This modification is made by depositing a layer of insulating material on the side of the field effect semiconductor material opposite the side in contact with the electroluminescent phosphor, the deposited electrostatic charge pattern residing, in this embodiment, on the insulator surface rather than on the surface of the semiconductor material itself. Typical semiconductors exhibiting the field effect phenomenon which can be modified by deposition of an insulator layer include cadmium sulfide, zinc sulfide, activated zinc sulfide, zinc oxide, cadmium selenide, etc. In the alternative, a barrier layer can be produced along the outer surface of the semiconductor material by suitably doping the semiconductor to provide a p-n junction. The junction will act as a blocking layer preventing the passage of surface charge into the underlying material.

For brevity, the storing field effect semiconducting material will be referred to herein as the semiconducting material or the field effect semiconducting material, it being understood that the storage panel has an exterior surface which is capable of retaining an electrostatic charge pattern thereon for substantial periods of time.

It is thus apparent that the term "field effect semiconductor" has been defined to include single layer materials as well as a two-layered structure wherein the semiconductor material is modified as stated above. While these materials have been drawn together for purposes of definition, they are not true equivalents for, in many circumstances as will hereinafter be described, they have different modes of operation. More importantly, though the results attained with these different structures may be equivalent from an operational point of view, it should be appreciated that the capability of achieving a desired result with a single material renders that material far superior to a second material which must be modified, in a stated manner, to achieve the same result.

Besides substantially pure layers of the semiconductor, a wide variety of compositions can be utilized which comprise the semiconductor dispersed in a nonconductive resin binder, such as polyvinyl chloride. The ratio of semiconductor to binder can be in the range of 3/1 to 50/1. If the semiconductor is also a photoconductor, for example as in the case of zinc oxide, then it should have the aforementioned properties as well as being capable of dissipating the surface charge in response to impinging radiation. When photoconductive materials are utilized, various dyes and sensitizers can be added to the composition to extend or increase the spectral response of the composition, with the ones noted in the example being typical.

In operation, an alternating current voltage is applied between the spaced electrodes which is sufficient to induce electroluminescence when the semiconductor material is in low impedance state. It has been found that the deposition and retention of an electrostatic charge on the charge retaining surface of the electroluminescent panel can be used to control the flow of current from electrode to electrode. Deposition of the electrostatic charge increases the impedance of the semiconductor thereby reducing or interrupting the flow of current in adjacent areas. Reduction of current flow will cause a corresponding reduction in light output from the electroluminescent layer resulting in a half-toned response. If the current is lowered below that which is sufficient to induce electroluminescence, luminescence will not occur and that particular portion of the storage device will appear dark. Conversely, the impedance is lowered and current flow increased as the charges are neutralized or removed from the surface. Accordingly, by selectively placing and maintaining a charge pattern on the surface of the electroluminescent panel an image can be produced and stored upon the device.

When it is desired to produce a white picture on a black background, an electrostatic charge is uniformly deposited over the entire charge retention surface. Neutralizing or removing a portion of the charge will cause current flow in adjacent areas thereby resulting in luminescence of the phosphor layer beneath the areas where charge has been neutralized or removed. A white picture on a black background can also be obtained by depositing a selected electrostatic charge pattern wherein dark background areas correspond to areas of charge deposition. Luminescence of the phosphor layer beneath those areas of the semiconductor layer where no charge resides will produce a white picture on a black background.

When it is desired to have a black picture on a white background, a selected electrostatic charge pattern is placed on the charge retention surface. This results in an increase in the impedance of the semiconductor thereby interrupting the flow of current in adjacent areas. When current flow falls below the level which is sufficient to induce electroluminescence, that portion of the storage device where the charge resides will appear dark, and a black on white picture will be obtained. Alternatively, a uniform electrostatic charge can be applied to the charge retaining surface and then a portion of the charge corresponding to the light background areas can be removed or neutralized to produce the desired result of a black picture on a white background.

The nature of the invention will be more easily understood when it is considered in conjunction with the accompanying drawings of exemplary preferred embodiments of the invention wherein.

It should be understood that in all of the figures the thickness of the layers, electrodes, etc. have been greatly exaggerated to show the details of construction.

Figures 1, 2:
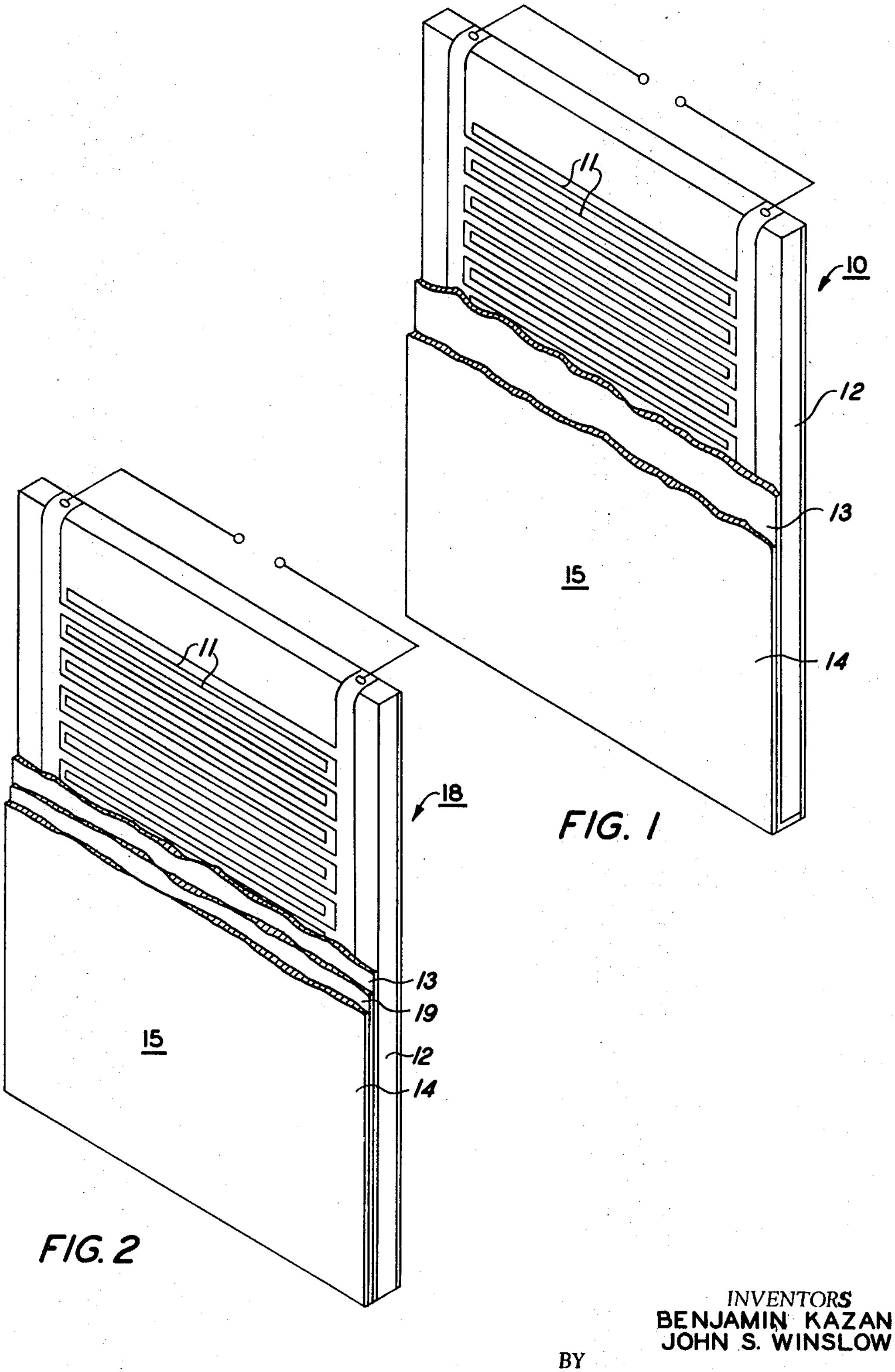
FIG. 1 is a partially broken away perspective view of an embodiment of an imaging device of the present invention.
FIG. 2 is a partially broken away perspective view of another embodiment of an imaging device of the present invention.

Referring to FIG. 1, the imaging device 10 comprises a plurality of spaced electrodes 11 mounted on a supporting substrate 12. Contacting each of the electrodes 11 is an electroluminescent material 13; specifically, the electroluminescent material 13 forms a layer contacting each of said electrodes 11. A layer of field effect semiconductor material 14 having a charge retaining surface 15 is disposed over electroluminescent material 13.

In FIG. 2, the imaging device is the same as device 10 in FIG. 1 except that a layer 19 of opaque insulating material is positioned between the electroluminescent material 13 and field effect semiconductor material 14. The opaque insulating material 19 is formed, for example, of lampblack in a suitable binder and sprayed onto the electroluminescent material 13. Layer 19 prevents light feed-back from the electroluminescent material to the field effect semiconductor material should the latter material also be a photoconductor which is responsive to the light emitted during luminescence.

Figure 3:
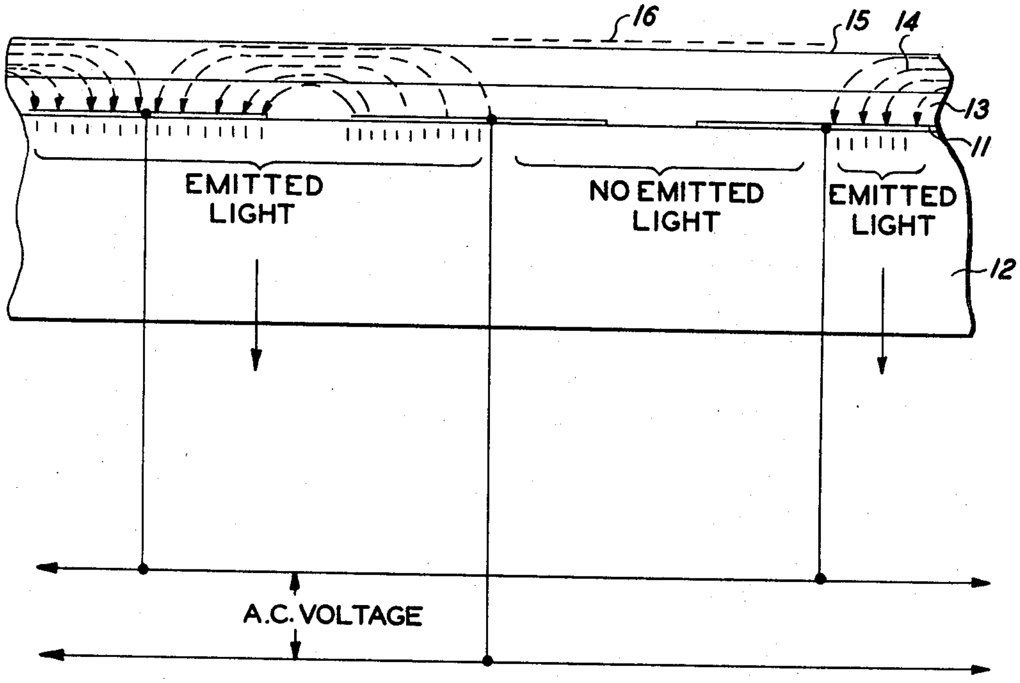
FIG. 3 is a schematic illustration of an apparatus employing the imaging device of FIG. 1.

Referring to FIG. 3, on at least a portion of the charge retaining surface 15 of device 10, there is an electrostatic charge pattern 16 adapted to regulate the flow of current through the field effect semiconductor material. More specially, the selected electrostatic charge may consist of negatively charged oxygen ions. The current flow through the field effect semiconductor layer 14 is adjacent to surface 15 between adjoining electrodes, yet the current is substantially electrically insulated from surface 15 due to the physical characteristics of the field effect semiconductor material.

In operation, alternating current voltage is maintained between the adjacent transparent conducting strips. Depending on the conductivity of the field effect semiconductor layer, more or less alternating current will follow the path indicated by the dashed lines in FIG. 3 from one electrode to the next. Referring to FIG. 3, it can be seen that the current flows through the electroluminescent layer, through the field effect semiconductor layer and back through the electroluminescent layer to complete the circuit. When sufficient current is being passed through the electroluminescent layer, it emits light in areas adjacent the electrode strips through which current flows.

The method of the present invention involves forming a device such as set forth in FIG. 1 and then positioning the device 10 beneath suitable means, such as a grid of corona wires, to deposit a selecter electrostatic charge in charge retaining surface 15. An electrostatic charge pattern 16 is deposited on surface 15 and an alternating current voltage is applied to electrodes 11 which would be sufficient to cause luminescence of the electroluminescent material 13 in the absence of the deposited electrostatic charge pattern 16.

Figure 4:
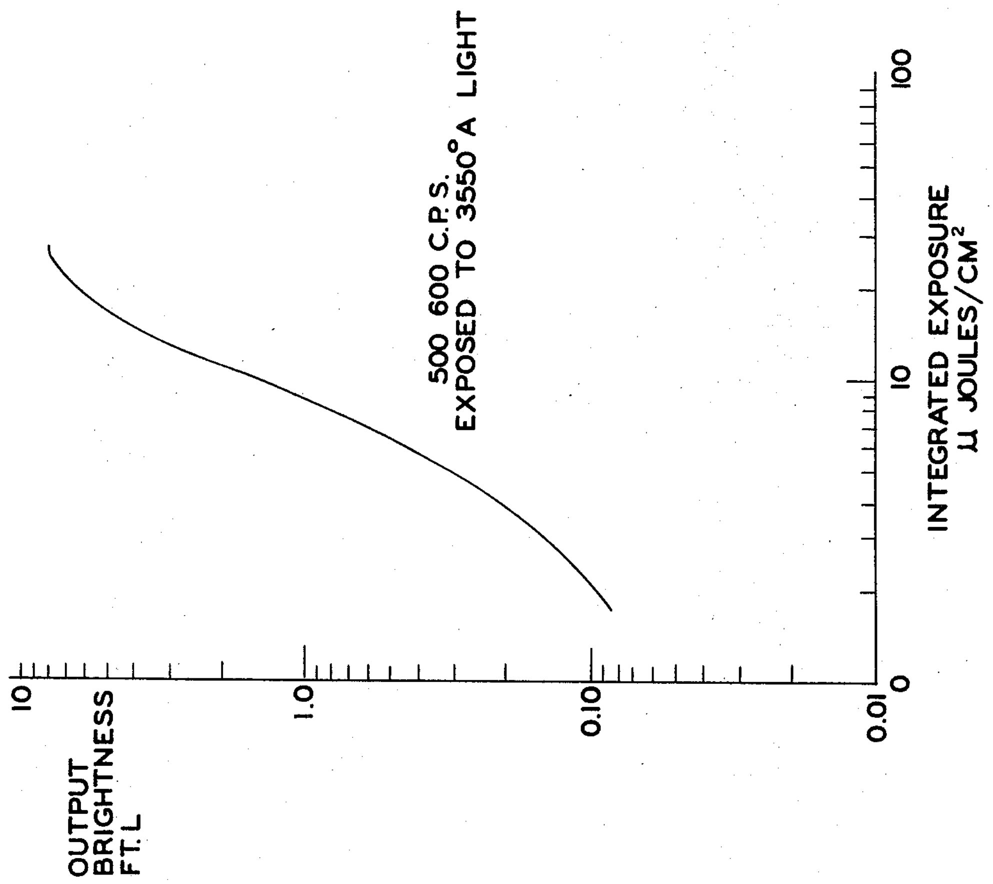
FIG. 4 shows presently attained output brightness as a function of light exposure for an apparatus incorporating the device of the present invention.

An exemplary corona discharge device comprises one-half mil tungsten wire extending the width of panel 10 with the wires being spaced at about 2 cm. intervals from each other and spaced about 2 cm. from the panel surface. A negative potential of about 7 kilovolts is applied to such wires, whereby the surface of the panel is charged with potential ranging from about 200 to 400 volts. The panel is exposed to successive pulses of about 3500 angstrom wavelength light of known energy and the output brightness is measured after each pulse. The output brightness for a panel such as that described above is shown in FIG. 4 where an alternating voltage of 500 volts at a frequency of 600 cycles per second is applied. Erasure of the panel is accomplished simply by again applying the 7 kilovolt corona discharge for several seconds which produces a corona current of about 0.5 milliamp. In this way, the surface is quickly recharged with a uniform charge so prior image formation due to charge variation is eliminated.

As previously noted, a uniform electrostatic charge can be deposited on surface 15 and then a portion thereof removed to give the selected charge pattern or, in the alternative, the selected charge pattern can be deposited initially. In this manner, an image can be produced and stored on the solid state storage panel of the present invention.

If it is desired to view the electroluminescent storage device from the side opposite the field effect semiconductor side then supporting substrate 12 and spaced electrodes 11 should be transparent. A suitable substrate-electrode combination is optically transparent glass overcoated with thin optically transparent electrodes of tin oxide. The transparent electrodes may be produced by applying tin oxide produced by the vaporous reaction of stannic acid, water, and methanol through a suitable mask. "Mylar" is also an acceptable transparent substrate.

If it is desired to view the image from the field effect semiconductor side of the unit, then the field effect semiconductor should be transparent. In this latter structure, the panel can be fabricated on an opaque insulating base using opaque, for example metallic, electrodes. This results in a lower cost unit which can be fabricated upon both sides of the electroluminescent layer.

Further specific embodiments of imaging devices of the present invention can be seen in FIGS. 5–9. In the embodiment shown in FIGS. 5 and 6 the electroluminescent device 30 includes a supporting substrate 31 having an electrode in the form of conducting layer 32 mounted thereon. Overlying the conductive layer 32 is a layer 33 of electroluminescent material. Positioned above and spaced from the electroluminescent layer 33 is a grid electrode 34. Between the grid electrode 34 and electroluminescent layer 33 is deposited a layer 35 of field effect secimonductor material whose upper surface forms a plurality of recesses 36 between the individual grid strands of electrode 34. This arrangement increases the area exposed to charge deposition and removal and also increases the control by such charge over the current passing between electrodes 32 and 34 through the field effect semiconductor ridges formed by recesses 36. A layer of opaque insulating material can be positioned between the electroluminescent material 33 and field effect semiconductor material 35 in the same manner and for the same purpose as discussed with reference to FIG. 2. It should be noted that in FIGS. 5 and 6 the current flow path between adjoining electrodes passes through the electroluminescent material only once since the electrodes are on opposite sides of the electroluminescent layer.

Figure 7:
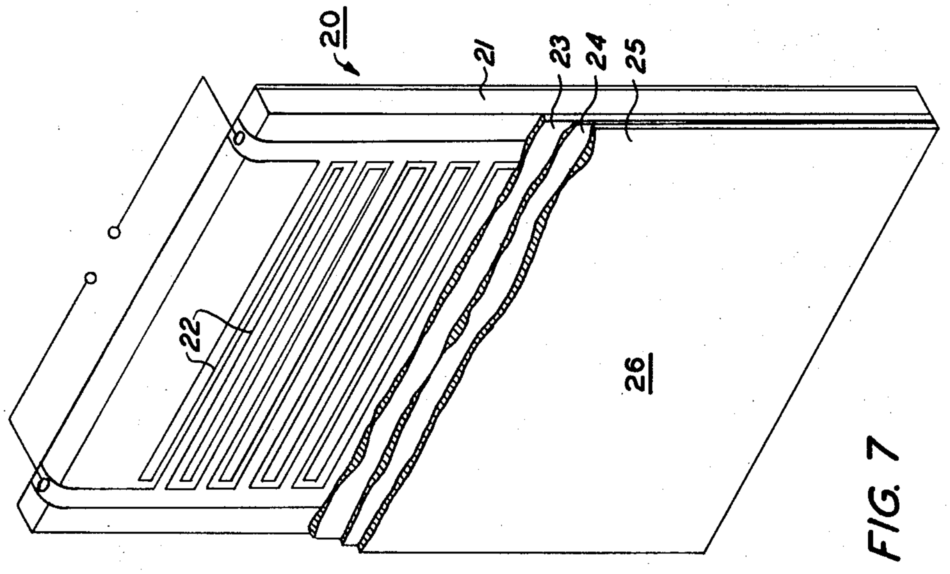
FIG. 7 is a partially broken away perspective of still another embodiment of the imaging device of the present invention.

FIG. 7 illustrates a further embodiment of the present invention wherein a photoconductive insulator is utilized to store a charge on the outer surface of the imaging device. If a uniform charge is applied, at least a portion of the stored electrostatic charge is then dissipated from the surface of the photoconductive insulator by subjecting the photoconductive insulator to radiant energy of suitable wavelength in a selected pattern configuration.

Referring to FIG. 7, an electroluminescent device 20 includes a supporting substrate 21 having a plurality of spaced electrodes 22 mounted thereon. Overlying each of the electrodes 22 is a layer of electroluminescent material 23. Electrically connecting adjacent portions of the electroluminescent material 23 is a layer 24 of field effect semiconductor material. Finally, contacting the layer 24 is a layer 25 of photoconductive insulating material having charge retention surface 26. On at least a portion of the photoconductive insulating surface 26 is a selected electrostatic charge pattern adapted to regulate the flow of current through the adjacent portion of semiconductive material 24. In this particular instance, the layer of field effect semiconductor material 24 can be cadmium sulfide and the layer of photoconductive insulating material 25 can be selenium.

A layer of opaque insulating material can be positioned between the electroluminescent material 23 and the field effect semiconductor material in the same manner and for the same purpose as discussed with reference to FIG. 2. Further, a thin insulating layer can be positioned between the photoconductive insulator layer and the field effect semiconductor layer to prevent direct injection of charge from the photoconductive insulator to the field effect semiconductor.

Any photoconductive insulator material can be used in place of the selenium provided the material is capable of storing an electrostatic charge on its surface and dissipating said charge in response to radiant energy impinging thereon. Similarly, other field effect semiconductor materials can be used in place of cadmium sulfide provided they perform the same functions as being applicable to that material.

The electrostatic charge pattern can be produced on the surface of the electroluminescent device by any suitable means. As will hereinafter be described, it is contemplated that optical or electrical means can be utilized to deposit the desired charge pattern.

One manner of producing a charge pattern is by uniformly depositing charged ions on the charge retention surface and then dissipating a portion of said ions to form either a positive or a negative of the image to be produced. For example, if the field effect semiconductor also has photoconductive insulating properties, such as the case with zinc oxide, a uniform electrostatic charge can be deposited by any well known means, including corona discharge. Selective dissipation of a portion of the stored charge pattern can be done by exposing only portions of the material to sensitizing light. Electrostatic charge will be dissipated in areas where the radiation impinges upon the surface resulting in the lowering of the impedance in turn causes current to flow resulting in luminescence of the electroluminescent material.

In contrast to where the storage panel is exposed to a light image, one or more point suorces of light can be made to scan the storage panel surface. Modulation of the intensity of the input light will result in a corresponding half-toned image.

Alternatively, means may be provided for initially depositing charged ions in the desired charge pattern. Electrical means are positioned adjacent the charge retention surface for selectively depositing electrostatic charges on elemental areas thereof. By sequentially depositing more or less electrostatic charge at each elemental area, a corresponding output image will be produced for viewing. It is contemplated that the device which will be described for producing this desired charge pattern can also be utilized to neutralize any portion of corona discharge which might exist on the charge retention surface because of prior charge deposition.

Figure 8:
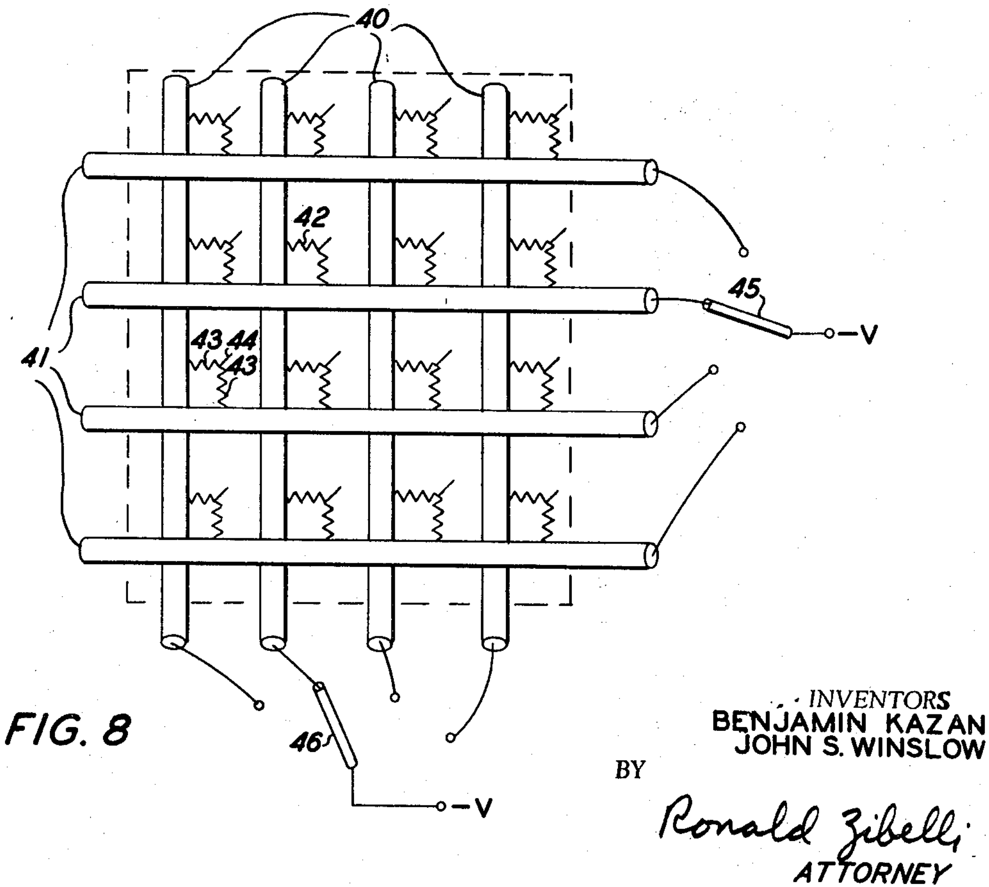
FIG. 8 is an enlarged top view of a device for depositing electrostatic charge.

Referring to FIG. 8, there can be seen a device for producing a pattern of corona charges on the charge retention surface.. Two sets of conducting bars 40 and 41 are provided with the first set 40 lying in a plane parallel to the plane of the charged retention surface and slightly below the plane of the second set 41. Where each conducting bar passes over a conducting bar in the lower plane, there are connected together with a resistor divider 42 consisting of two equal resistors 43 in series. At the midpoint of the resistor divider 42 a metallic point 44 for producing corona is connected with the point protruding downward (i.e., perpendicular to the plane of the bars and towards the charge retention surface) so that an array of corona points is positioned above the surface but not touching it.

By means of horizontal scanning switch 45 and vertical scanning switch 46 a voltage sufficient to cause corona discharge at point 44 is applied to one of the horizontal bars and to one of the vertical bars, respectively. The full voltage will appear across the corona point 44 causing the generation of a corona charge which will fall upon the surface immediately below the point. If prior to deposition of the corona charge, alternating current voltage has been applied to the storage device thereby causing the entire electroluminescent area to luminesce, deposition of a corona charge will cause an increase in the impedance of the field effect semiconductor material and the storage device will become dark in those areas corresponding to charge deposition. Conversely, if the applied corona is neutralizing previously deposited electrostatic charge, then the impedance of the field effect semiconductor material will be decreased and the electroluminescent material will luminesce in those areas corresponding to charge neutralization.

Voltage may be switched to other bars causing different corona points to emit corona and, correspondingly, darken selected areas of the storage device. By sequentially switching the voltages from one conducting bar to another, the entire charge retention surface may be scanned to produce a stored image (i.e., a pattern of light and dark). It should be noted that the voltage applied to each of the switches 45 and 46 can be modulated in magnitude by a video signal during the scanning process thereby permitting the recording of a half-toned image. Additionally, it should be noted that although the switching means as shown in FIG. 10 are mechanical, switching can also be accomplished electrically by providing appropriate electronic switching circuitry, as would be apparent to one skilled in the art.

To erase the stored image, voltage is applied to the switches to produce corona of opposite charge to the corona existing on the surface for neutralizing the existing charge and making selected elements of the panel bright. The erasing may be accomplished sequentially as in the initial formation procedure or voltage can be applied to all the bars so that corona is generated from all points simultaneously. Alternatively, the panel can be uniformly flooded with sensitizing light if the semiconductor is also photoconductive, as is the case of zinc oxide.

As previously indicated, the entire charge retention surface can be initially charged by corona from the array of corona points so that the entire panel output is dark. Subsequentially, selected corona points can be caused to emit neutralizing corona thereby resulting in a bright emission from those portions of the panel beneath the neutralized charge.

A further device for depositing the electrostatic charge pattern comprises one or more corona point sources which can be caused to scan the charge retention surface. The simultaneous application of electrical input signals to the corona points with the resultant deposition of neutralization of electrostatic charge will either produce or modify an image on the electroluminescent storage device. In this embodiment, either the corona point system can be caused to scan back and forth or, in the alternative, the storage device itself can be made to oscillate under one or more corona point sources.

Electrostatic charges can also be deposited by using the apparatus disclosed by Schwertz in U.S. Pat. No. 3,023,731. Specifically, the recording heads of FIGS. 5 and 7 and the character drum of FIG. 3 of that reference can be used, in the manner as disclosed therein, to deposit a selected ionic charge pattern upon the charge retention surface of the instant storage device.

The particular physical characteristics of zinc oxide, lead oxide, and cadmium oxide enable one to store negative ionic charge pattern on its surface and control current flow through the body thereof by means of said charge unit without substantially altering the charge pattern. Negative oxygen atoms, such as obtained by corona discharge or the electrostatic discharge disclosed by Schwertz in the aforementioned patent, are particularly suitable to control current flow. It has been found, however, that deposition of electron or positive ionic charge patterns do not have controlling effect because the field effect semiconductor will not retain such a charge on its surface. Accordingly, it is necessary to provide an insulating layer over the field effect semiconductor material when one wishes to control current flow by means of electron or positive ionic charge patterns. Additionally, in this embodiment, the conductivity of the field effect semiconductor layer can be increased by depositing positive charge on the charge retention surface (i.e., the exposed surface of the insulator). Such deposition can be used for producing, modifying, and/or reversing a stored image. Besides operating in the manner as previously disclosed, current, which is insufficient to induce electroluminescence of the phosphor layer when the semiconductor material is in its high impedance state can be applied and then the conductivity of the semiconductor layer can be increased by depositing sufficient positive charge on the insulator layer. If sufficient positive charge is deposited the conductivity will be increased to a point where current will flow causing luminescence of the underlying phosphor layer. By depositing a particular positive ionic electrostatic charge pattern on the insulator layer an image can be produced and stored upon the device.

Figures 5, 6, 9:
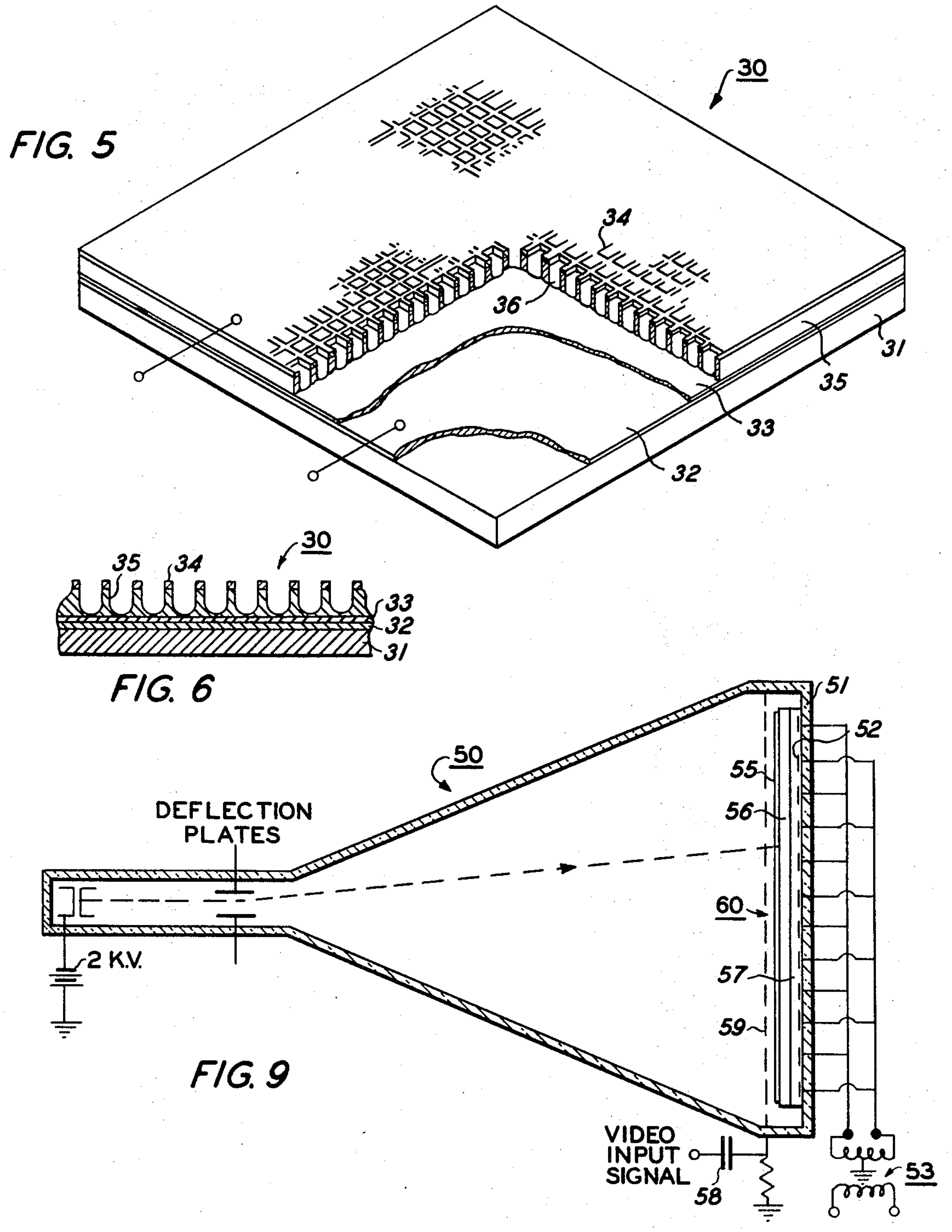
FIG. 5 is a partially broken away perspective view of another embodiment of the imaging device of the present invention.
FIG. 6 is an enlarged cross-sectional view of FIG. 5.
FIG. 9 is a schematic sectional view of a storage tube in accordance with this invention.

A device for depositing or modifying an electron charge pattern on a charge retention surface of a storage panel is a direct view storage tube having an appropriate electron beam. Referring to FIG. 9, there is seen a storage tube 50 having on the inner surface of the glass faceplate 51 a set of transparent conducting electrodes 52 (the electrodes are running into the plane of the paper). Alternate conducting electrodes 52 are connected to one side of the secondary of a transformer 53 while the immediate of the conducting electrodes 52 are connected to the other side of the secondary transformer 53. Appropriate well known means are provided to produce an electron beam 54. By means of the scanning of electron beam 54, a pattern of charge is established on the surface of insulator 55 overlying field effect semiconductor 56 which is overlying electroluminescent layer 57. For establishing a charge pattern, an input video signal is applied through capacitor 58 to barrier grid 59 adjacent the target surface while the surface is scanned by an unmodulated electron beam. As shown, about two kv. potential difference is maintained between barrier grid 59 and the cathode of the storage tube so that the secondary emission ratio is greater than unity.

During the operation, the electron beam 54 is scanned over the target 60. The scanning of the beam 54 will drive the scanned surface target 60 substantially to the potential of the barrier grid 59 by secondary emission. With the barrier grid 59 at zero or ground potential, i.e. no input signal applied, the beam 54 drives the exposed surface of target 60 to an equilibrium potential of approximately zero or ground. With this zero potential applied to all of the elemental units across the target 60 the potential drop of the alternating current source is substantially across electroluminescent layer 57 only. When input signals are applied through capacitor 58 to the barrier grid 59 a charge is established by secondary emission on the areas of the target 60 that are struck by the beam 54. The amount of charge established depends upon the magnitude of the input signal applied to the barrier grid 59 because the amount of secondary emission depends upon the signal applied to screen 59. The polarity of the signal may be either positive or negative with respect to ground. When a charge pattern is developed on the elemental areas of target 60, the conductance of the field effect semiconductor material is decreased and if decreased a sufficient amount will cause a portion of the target 60 to darken. Depending upon the magnitude of the input signal, a half-tone response can be obtained. As each element is scanned by the electron beam the bombarded spot assumes the new potential of the barrier grid irrespective of its previous potential acquired in image formation. Thus, it is not necessary to use a separate erasing gun or to change operating potentials, it is only necessary to modify the input signal.

Electrostatic charge can be deposited on the charge retention surface of the panel, or prior charge can be neutralized, by moving the panel passed the row of pins of a cathode ray pin tube. In this arrangement, electrical input signals can be applied to the control grid of the tube while the pins are being scanned by the electron beam resulting in a linear charge pattern on the charge retention surface. By moving the storage panel in a direction perpendicular to the beam scanning direction, successive lines of charge can be deposited to provide, or modify, a storage image.

The operation of the solid state storage device of the present invention will now be described with reference to such a device having a zinc oxide storing field effect semiconductor layer. It should be understood, however, that this discussion is entirely applicable to all other field effect semiconductor materials which exhibit, or can be made to exhibit, the physical characteristics previously specified in connection with the detailed description of this invention.

A glass plate about 6 inches long and about 6 inches wide are ⅛ inch thick has a grid of transparent NESA glass conducting strips formed thereon. Each NESA electrode strip extends the width of the plate and has a width of about 60 mils and a thickness of about 2,000 A. The electrode strips are mounted parallel to each other with a uniform spacing of about 20 mils. Coated over the electrode strips on the glass plate is a layer of about 2 mils thickness of electroluminescent phosphor in an epoxy resin binder. On top of the electroluminescent layer there is deposited a zinc oxide storing field effect semiconductor layer having the following composition:

| Material: | Pounds per 100 gallons |
|---|---|
| Zinc oxide | 533.000 |
| Pliolite S–5D [1] | 107.000 |
| Chlorinated paraffin | 27.000 |
| Toluene | 533.000 |
| Bromophenol blue | 0.021 |
| Methyl green | 0.016 |
| Acridine orange | 0.016 |
| | 1200.053 |

[1] Pliolite S–5D is a styrene butadiene copolymer produced by the Chemical Division of the Goodyear Tire and Rubber Co., Akron, Ohio. A detailed discussion of the aforementioned zinc oxide composition is set forth in the publication titled "Tech-Book Facts," Formulations PLS–37, Chemical Division, Goodyear Tire and Rubber Co., Akron, Ohio.

The zinc oxide layer has a thickness of 1 mil and is deposited by any convenient means, such as spraying, etc.

Negative oxygen ions are deposited in the dark on the zinc oxide surface by a corona discharge device. The zinc oxide surface retains the negative charges rather than giving them up to the body of the field effect semiconductor and these negative charges reduce the conductance of the zinc oxide by repelling conduction electrons. Insofar as the negative charges remain on the surface for any period of time, the conductivity of the underlying zinc oxide remains correspondingly reduced for that period. This greatly reduces the alternating current flowing between electrodes thereby terminating and/or reducing the emitted light from the electroluminescent material. A transient optical image is projected onto the zinc oxide surface, the light of the optical image neutralizing the negative ions at the illuminated areas. The zinc oxide becomes conductive in the exposed areas while remaining nonconductive in the charged area. In accordance with the stored charge pattern selectively produced, a bright visible pattern is observed from the electroluminescent layer through the glass support plate. As long as the charge pattern remains on the charge accessible surface, the visible image is retained on the storage panel. When desired, the image is erased by exposing the charge accessible surface to a uniform corona discharge thereby reducing the conductivity of the field effect semiconductive layer with the resultant termination of luminescing current. A new input image can now be stored.

Converse to the above example, the conductivity of the zinc oxide field effect semiconductor layer can be increased by providing an insulator layer on the exposed zinc oxide surface and then depositing positive charge on the exposed insulator surface. Such deposition can be used for producing, modifying and/or reversing a stored image.

The method of the present invention may also utilize the increase in conductivity of a photoconductive field effect semiconductor material when subjected to radiant energy of suitable wavelength. This former method provides good image where the field effect semiconductor material has substantial dark conductivity; however, if the initial dark conductivity is low, the control of only the dark current may not be sufficient to produce a sufficiently bright image. In such a situation, this modified method increases the initial current level by exposure of the photoconductive field effect semiconductor material to radiant energy of a suitable wavelength. By such exposure, the initial conductivity may be increased substantially above the dark conductivity and such increase can remain substantially unchanged for an extended period of time. Specifically, the method involves initially exposing the device for a brief period of time to light. For example, the device may be flooded with light from a fluorescent lamp for several seconds. The surface of the device is then corona charged and, finally, the surface electrostatic charge is selectively dissipated by the radiant energy image whole reproduction is desired.

The electrode strips employed are merely convenient means for accurately selecting the length and cross-sectional area of the current path. Thus, by decreasing spacing between the adjoining electrodes and/or by increasing the thickness of the field effect semiconductor composition coating, one can increase the current therethrough for a given set of conditions. Additionally, the fineness and closeness of the spacing of the electrode strips determine the ultimate resolution of the device. Electrical breakdown problems may occur when the strips are too small or are too closely placed; this, of course, will be determined by the applied voltages, materials placed between the electrodes, etc. Electrodes 10 mils wide spaced 10 mils apart have been used successfully. The electrode strips may have any configuration as long as the electrostatic charge pattern on the charge retention surface continues to control the current flow between electrodes.

As a matter of convenience, the electroluminescent material has been shown in the form of a continuous layer. However, the electroluminescent material which lies in the spaces between the electrodes does not produce substantial electroluminescence during the operation of the device. Consequentially, such portions may be replaced by insulating material if desired. Thus, it is necessary that only the electrodes be coated with the electroluminescent material.

As previously indicated, to erase the stored image the charge retention surface can be given a uniform charge to render the panel dark or any charge pattern thereon can be neutralized rendering the panel completely bright. Such erasing may be accomplished sequentially or uniformly to all portions of the panel. By applying a controlled voltage to an array of corona wires such as disclosed in FIG. 8, adjacent the charge retention surface the input information can be made to decay at a controlled rate. Optionally, a single corona wire can be caused to move over an appropriate input signal, such as from a cathode ray tube, etc. In this latter embodiment, rather than having the image fade out gradually over the entire panel, only the information just ahead of the moving corona wire will be erased. New information can be continually written in to replace old information in a partial rather than complete manner.

While the utility of the storage panel herein disclosed is manifest, it is contemplated that the output luminescent image from the panel can be used to expose a xerographic plate. Thus, a single input image which is stored on the device can be used to repeatedly expose a xerographic plate for the production of a multiplicity of copies. Since the output image can persist for a substantial period of time, the xerographic plate can be exposed and developed many times before the luminescent image has decayed. In one arrangement, the storage panel is fabricated on a thin insulating film, such as Mylar, of 1 mil thickness and the output image from the panel irradiates a standard selenium xerographic plate and, in a second arrangement, zinc oxide coated paper. As the contact of an insulating surface to a charged zinc oxide layer has been found to have little influence on discharging the latter, the aforesaid arrangement can be placed as close as desired to the charged paper. After appropriate exposure to the output of the storage panel, the paper can be separated from the storage panel and developed with toner. In this manner, a plurality of acceptable copies can be made from a single input image retained on the storage panel. An alternate method for optically coupling the storage panel output to the xerographic plate or the zinc oxide paper is to use a glass plate, or a glass plate of fiber optics, as the base or support layer for the storage panel.

When zinc oxide is utilized as the field effect semiconductor, it has been found that a charged sheet of zinc oxide paper can be placed in direct contact with the zinc oxide surface of the storage panel without disturbing the information stored thereon in the form of the regulating electrostatic charge. Thus, if the output image of the storage panel is emitted through the zinc oxide field effect semiconductor layer, the output will directly expose the charged zinc oxide paper which can then be developed in a conventional manner. Multiple copies can be made using this technique from a single input image. There are many features in the present invention which clearly show the significant advance the present invention represents over the prior art. Consequently, only a few of the outstanding features will be pointed out to illustrate the unexpected and unusual results attained by the present invention.

One feature of the present invention is that the presence (or absence) of the electrostatic charge pattern controls the current flow through the electroluminescent phosphor layer. Once the charge pattern is established, the input signal can be terminated but the output will continue until such time as the electrostatic charge pattern has dissipated from the charge retention surface. In the case of zinc oxide, the output signal can remain for substantial periods of time after the input signal, for example an optical image, has been cut off. Still another feature is that it readily permits image formation by the total or integrated radiant energy input to the device unlike the conventional photoconductive devices which rely substantially upon the instantaneous radiant energy intensity. More specifically, in the conventional photoconductive device the conductivity thereof is increased above a given reference level by the generation of hole-electron pairs in the semiconductor material by the impinging radiation and such increase in conductivity is maintained by the continuous generation of such hole-electron pairs during exposure to such radiation. On the other hand, in the present invention, the conductivity of the device is either decreased or increased from an initial reference level to a given reference level by the deposition of a negative or positive electrostatic charge respectively on the surface of the device. For example, in the case of field effect semiconductor material such as zinc oxide, a negative electrostatic charge on the surface of the body decreases the conductivity of the body from an initial reference level to a given lower level. Then, by impinging radiant energy on the charge surface, the charge is dissipated in proportion to the total amount of radiation energy impinging thereon so that the conductivity is proportionally returned to the initial reference level. Thus, the present invention is inherently capable of signal integration utilizing a relatively simple structure.

Still another feature of the present invention is an imaging device wherein the current flow through the electroluminescent is regulated by the electrostatic field formed by an electrostatic charge on the surface of the device. With such an arrangement it has been found that both high level output brightness as well as good halftones may be produced unlike prior art devices which usually must sacrifice one or the other.

Still another feature of the present invention is an imaging device and method wherein the image is stored by the retention of the electrostatic charge variation on the surface of the device and then erased by the dissipation such charge variation. Consequently, the device of the present invention has a relatively long image storage time corresponding to the charge storage. Similarly, and more important, such feature permits the erasure of the image simply by flooding the surface of the device with an electrostatic charge which quickly recharges the surface with a uniform charge. Thus, it is possible to remove the image very quickly with a very low power input.

It will be understood that the foregoing description and example are only illustrative of the present invention and it is not intended that the invention be limited thereto. All substitutions, alternations and modifications of the present invention which come within the scope of the following claims or to which the present invention is readily susceptible without departing from the spirit and scope of this disclosure, are considered part of the present invention.

What is claimed is:

1. A storage device comprising an electroluminescent panel comprising a plurality of spaced electrodes, a layer of electroluminescent material including at least one portion forming part of an electrical connection between said electrodes, and a layer of field effect semiconductor material overlying stad electroluminescent maeerial and forming a successive part of said electrical connection, said electroluminescent panel having a charge retaining surface adjacent at least a portion of said field effect semiconductor material; and means to produce an electrostatic charge pattern on said charge retaining surface of said panel.

2. The storage device of claim 8 wherein the field-effect semiconductor is a storing field-effect semiconductor, said storing field-effect semiconductor being capable of retaining an electrostatic charge pattern on a charge retaining surface thereof and conducting current through the body thereof without substantially altering said surface charge pattern.

3. The storage device of claim 2 wherein the storing field effect semiconductor is zinc oxide.

4. The storage device of claim 2 wherein the storing field effect semiconductor is lead oxide.

5. The storage device of claim 1 wherein said means for forming an electrostatic charge pattern on said charge-retaining surface is spaced therefrom and out of direct contact therewith.

6. A method of creating an amage comprising providing a storage device as defined in claim 2 wherein the exposed surface of said storing field effect semiconductor is the charge retaining surface of said electroluminescent panel, forming an electrostatic charge pattern on at least a portion of said exposed charge retaining surface, said charge pattern being adapted to regulate the flow of current through said storing field effect semiconductor material, and passing current between said electrodes through said storing field effect semiconductor material and said electroluminescent material.

7. The method of claim 6 wherein the electrostatic charge pattern is formed with negatively charge ions.

8. A solid state storage device comprising an electroluminescent panel comprising a plurality of spaced electrodes, electroluminescent material including at least one portion forming part of an electrical connection between said electrodes, and a layer of field-effect semiconductor material overlying said electroluminescent material and forming a successive part of said electrical connection, said electroluminescent panel having an exposed charge-retaining surface adjacent at least a portion of said field-effect semiconductor material, said field-effect semiconductor material being capable of conducting current through the body thereof and having the conductance thereof modified in accordance with an electrostatic charge pattern on said exposed charge-retaining surface; and means for forming an electrostatic charge pattern on said exposed charge-retaining surface, said charge pattern controlling by field-effect the current flow between said electrodes.

9. The solid state storage device of claim 8 wherein the field-effect semiconductor is a storing field-effect semiconductor and said exposed charge-retaining surface of said electroluminescent panel is the exposed surface of said storing field-effect semiconductor material disposed opposite the interface between said storing field-effect semiconductor material and said electroluminescent material.

10. The solid state storage device of claim 8 further including a photoconductive insulating layer overlying said field-effect semiconductor material, said exposed charge-retaining surface corresponding to the exposed surface of said photoconductive insulating material disposed opposite the interface between said photoconductive insulating material and said field-effect semiconductor material.

11. The solid state storage device of claim 8 wherein the electroluminescent material is in layer form.

12. The solid state storage device of claim 8 wherein the electroluminescent material comprises a segment of electroluminescent material overlying each of said plurality of electrodes supported by said supporting substrate, said electroluminescent segments being separated by intervening segments of insulating material.

13. The solid state storage device of claim 8 further including a thin opaque insulating layer positioned between said electroluminescent material and said overlying field-effect semiconductor material.

14. The storage device of claim 8 wherein the storing field effect semiconductor is cadmium oxide.

15. The storage device of claim 10 wherein the field effect semiconductor is cadmium sulfide and the photoconductive insulator is selected from the group consisting of selenium, an alloy of selenium with arsenic, and an alloy of selenium with tellurium.

16. The storage device of claim 8 wherein the field-effect semiconductor is doped to provide a p-n junction along the exposed surface of said semiconductor material opposite the surface in contact with said electroluminescent material, the exposed surface of said junction acting as the exposed charge retaining surface and preventing passage of the surface charge comprising the electrostatic charge pattern into the underlying material.

17. The storage device of claim 8 wherein the means for producing an electrostatic charge pattern comprises means for depositing a uniform electrostatic charge on said charge retaining surface and means to selectively render a portion of said charge retaining surface free from said electrostatic charge.

18. The storage device of claim 8 wherein the means for producing an electrostatic charge pattern deposits said charge in a selected charge pattern configuration.

19. The storage device of claim 8 wherein the means for producing an electrostatic charge pattern comprises a corona discharge device.

20. The storage device of claim 19 wherein the corona discharge device comprises a first set of conducting bars, a second set of conducting bars in parallel spaced relationship to said first set, the longitudinal axis of said bars in said second set being perpendicular to the longitudinal axis of said bars in said first set, a set of units of resistor dividers and metallic corona discharge points, each resistor divider and metallic corona discharge point unit connecting one of said bars in said first set with one of said bars in said second set adjacent the intersection of the vertical planes passing through the longitudinal axis of each bar, each of said metallic corona discharge points being positioned adjacent said charge retaining surface of said electroluminescent panel, and means to cause corona discharge from said metallic points.

21. The storage device of claim 8 wherein the means for producing an electrostatic charge pattern comprises an evacuated storage tube having means for producing an electron beam, the electroluminescent panel comprising the target of said storage tube.

22. The storage device of claim 8 wherein the field-effect semiconductor material has photoconductive insulating properties, and the means to selectively render a portion of said charge retaining surface free from electrostatic charge comprises optical means which irradiate said charge retaining surface with sensitizing electromagnetic radiation.

23. The storage device of claim 8 wherein said electroluminescent material forms a layer overlying at least one of said spaced electrodes, said field effect semiconductor material forms a layer overlying said electroluminescent material layer, and another one of said spaced electrodes is a grid electrode overlying said field effect semiconductor material layer.

24. A method of creating an image comprising providing a storage device as defined in claim 8, forming an electrostatic charge pattern on at least a portion of said exposed charge retaining surface of said electroluminescent panel, said charge pattern being adapted to regulate the flow of current through said field-effect semiconductor material, and passing current between said electrodes through said field-effect semiconductor material and said electroluminescent material.

25. The method of claim 24 wherein the electrostatic charge pattern is formed by first uniformly charging said charge retaining surface and then selectively removing a portion of said charge.

26. The method of claim 25 wherein the field-effect semiconductor material has photoconductive insulating properties and the selective removal of a portion of said electrostatic charge is achieved by irradiating said uniformly charged charge retaining surface with sensitizing electromagnetic radiation.

27. The method of claim 24 wherein a photoconductive insulator layer overlies said layer of field effect semiconductor material and the selective removal of a portion of said electrostatic charge is achieved by dissipating a portion of said charge in response to radiant energy impinging thereon.

28. The method of claim 24 wherein the electrostatic charge pattern is initially deposited in a selected charge pattern configuration.

29. A method of creating an image comprising providing a storage device as defined in claim 21, forming an electron charge pattern on at least a portion of said charge retaining surface by the modulated scanning of an electron beam, said electron charge pattern being adapted to regulate the flow of current through said field-effect semiconductor material, and passing current between said electrodes through said field-effect semiconductor material and said electroluminescent material.

30. The storage device of claim 8 wherein said means for forming an electrostatic charge pattern on said charge-retaining surface is spaced therefrom and out of direct contact therewith.

31. The solid state storage device of claim 8 further including a thin insulating layer overlying said field-effect semiconductor layer, said exposed charge-retaining surface of said electroluminescent panel corresponding to the exposed surface of said thin insulating layer disposed opposite the interface between said field-effect semiconductor material and said electroluminescent material.

32. The method of claim 24 wherein current flow between at least one pair of adjacent electrodes is sufficient to cause luminescence of those portions of said electroluminescent material beneath those areas of said charge-retaining surface upon which insufficient current flow-preventing electrostatic charge resides.

33. The storage device of claim 23 wherein said field-effect semiconductor material has troughs formed therein between portion of said grid electrode, said troughs being adapted for the deposition and retention of electrostatic charge thereon, said charge serving by field-effect to control the current flow between said one of said space electrodes and said grid electrode.

34. A solid state storage device comprising a supporting substrate having a plurality of spaced electrodes on one surface thereof, electro-luminescent material overlying said plurality of electrodes, and a layer of a storing field-effect semiconductor material overlying said electroluminescent material, said storing field-effect semiconductor layer having an exposed surface substantially parallel to the interface between said storing field-effect semiconductor layer and said electroluminescent material, said storing field-effect semiconductor being capable of retaining an electrostatic charge pattern on said exposed surface and conducting current through the body thereof without substantially altering said surface charge pattern; and means for forming an electrostatic charge pattern on said exposed surface of said storing field-effect semiconductor layer, the charge pattern controlling by field-effect the current flow between adjacent electrodes.

35. The solid state storage device of claim 34 wherein the storing field-effect semiconductor is zinc oxide.

36. The solid state storage device of claim 34 wherein the storing field-effect semiconductor is lead oxide.

37. The solid state storage device of claim 34 wherein the storing field-effect semiconductor is cadminum oxide.

38. The solid state storage device of claim 34 wherein the storing field-effect semiconductor has photoconductive properties.

39. The solid state storage device of claim 34 wherein the electroluminescent material comprises a layer overlying said plurality of electrodes.

40. The solid state storage device of claim 34 wherein the electroluminescent material comprises a segment of electroluminescent material overlying each of said plurality of electrodes, said electroluminescent segments being separated by intervening segments of insulating material.

41. The solid state storage device of claim 36 wherein said means for forming an electrostatic charge pattern on said exposed surface of said storing field-effect semiconductor layer comprises means to uniformly charge said exposed surface and means to irradiate said exposed surface with sensitizing electromagnetic radiation in image configuration.

42. The solid state storage device of claim 36 wherein the electroluminescent material comprises a layer overlying said plurality of electrodes.

43. The solid state storage device of claim 36 wherein the electroluminescent material comprises a segment of electroluminescent material overlying each of said plurality of electrodes, said electroluminescent segments being separated by intervening segments of insulating material.

44. A solid state storage device comprising a supporting substrate having a plurality of space electrodes on one surface thereof, electroluminescent material overlying said plurality of electrodes, a layer of field-effect semiconductor material overlying said electroluminescent material, and a layer of photoconductive insulating material overlying said field-effect semiconductor layer, said photoconductive insulating material layer having an exposed surface substantially parallel to the interface between said field-effect semiconductor layer and said electroluminescent material, said field-effect semiconductor material being capable of conducting current through the body thereof and having the conductance thereof modified in image configuration in accordance with an electrostatic charge pattern on the exposed surface of said photoconductive insulating material layer; and means for forming an electrostatic charge pattern on said exposed photoconductive insulating material surface.

45. A direct viewing storage device comprising an evacuated storage tube having a transparent faceplate; a target disposed on the internal surface of said faceplate for forming a visible image suitable for viewing through said faceplate; said target comprising a plurality of space electrodes disposed on said faceplate, electroluminescent material overlying said spaced electrodes, a layer of field-effect semiconductor material overlying said electroluminescent material and a thin insulating layer overlying said field-effect seimconductor layer, the exposed surface of said insulating layer comprising a charge-retaining surface; and means to produce an electrostatic charge pattern on said charge-retaining surface.

46. The storage tube of claim 45 wherein said means for producing an electrostatic charge pattern on said charge-retaining surface include means for producing an electron beam, means for focusing said beam over the exposed surface of said target, grid means in parallel space relationship to said target for collecting secondary emitted electrons, and means for applying input signals to said grid means.

47. A solid state storage device comprising a supporting substrate having an overlying conductive layer, electroluminescent material overlying said conductive layer, and a layer of a storing field-effect semiconductor material overlying said electroluminescent material, said storing field-effect semiconductor material layer having substantially regularly spaced troughs formed in the uppermost surface thereof, and a grid electrode contacting only the uppermost portion of said storing field-effect semiconductor layer thereby defining an exposed surface of said storing field-effect semiconductor layer corresponding to the surface area contiguous to said troughs, said storing field-effect semiconductor being capable of retaining an electrostatic charge pattern on said exposed surface and conducting current through the body thereof without substantially altering said surface charge pattern; and means for forming an electrostatic charge pattern on said exposed surface, the charge pattern controlling by field-effect the current flow between said conductive layer and said grid electrode.

48. The solid state storage device of claim 47 wherein the storing field-effect semiconductor is zinc oxide.

References Cited

UNITED STATES PATENTS

| | | | |
|---|---|---|---|
| 2,905,830 | 9/1959 | Kazan | 250—213 |
| 2,939,029 | 5/1960 | Wahlig | 313—108 |
| 3,023,731 | 3/1962 | Schwertz | 95—1.7 X |
| 3,086,139 | 4/1963 | Lehrer | 315—12 |
| 3,210,548 | 10/1965 | Morrison | 250—211 |
| 3,317,733 | 5/1967 | Horton et al. | 250—211 |
| 3,348,074 | 10/1967 | Diemer | 317—235 X |
| 3,441,736 | 4/1969 | Kazan et al. | 250—213 |

WALTER STOLWEIN, Primary Examiner

U.S. C. X.R.

340—173; 95—1.7; 96—1.5